US012717619B2

(12) United States Patent
Jiang et al.

(10) Patent No.: US 12,717,619 B2
(45) Date of Patent: Aug. 25, 2026

(54) DISTRIBUTED COMPUTING TOPOLOGY WITH ENERGY SAVINGS

(71) Applicant: International Business Machines Corporation, Armonk, NY (US)

(72) Inventors: Peng Hui Jiang, Beijing (CN); Fan Jing Meng, Beijing (CN); Jun Su, Beijing (CN); Cheng Fang Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 18/150,397

(22) Filed: Jan. 5, 2023

(65) Prior Publication Data

US 2024/0231906 A1 Jul. 11, 2024

(51) Int. Cl.
*G06F 9/48* (2006.01)
*G06F 9/38* (2018.01)

(52) U.S. Cl.
CPC .......... *G06F 9/4893* (2013.01); *G06F 9/3838* (2013.01)

(58) Field of Classification Search
CPC ............................ G06F 9/4893; G06F 9/3838
See application file for complete search history.

(56) References Cited

U.S. PATENT DOCUMENTS 10,693,743 B2 6/2020 Zhong et al.
2017/0373955 A1* 12/2017 Kocoloski ............ G06F 9/4893
2019/0394654 A1* 12/2019 Gardner ................ H04W 40/22
2022/0035678 A1 2/2022 Yang
2022/0261278 A1* 8/2022 Perneti .................. G06F 9/5027
2024/0154418 A1* 5/2024 Zeighami ................ H02J 3/003
2024/0195867 A1* 6/2024 Bapst .................... G06F 9/5072

FOREIGN PATENT DOCUMENTS

IN 202141031060 A 2/2022

OTHER PUBLICATIONS

Tang et al., "An Energy-Efficient Task Scheduling Algorithm in DVFS-enabled Cloud Environment," Journal of Grid Computing, Apr. 19, 2015, 21 pages.
Alworafi et al., "Cost-Aware Task Scheduling in Cloud Computing Environment," International Journal of Computer Network and Information Security, May 2017, 9 pages.

(Continued)

*Primary Examiner* — Prasith Thammavong
(74) *Attorney, Agent, or Firm* — Yee & Associates, P.C.

(57) ABSTRACT

A computer implemented method manages a topology for a network computing system. A number of processor units determines tasks for a workload to be performed by computing devices in the network computing system. The number of processor units creates the topology for performing the tasks in the workload. The topology comprises nodes representing the tasks assigned to the computing devices. The nodes are connected to each other based on an execution order for the tasks, and the topology has alternative paths for performing the tasks for the workload. The number of processor units determines energy consumption for the alternative paths in the topology. The number of processor units selects a particular path from the alternative paths for performing the tasks for the workload based on the energy consumption for the alternative paths.

18 Claims, 14 Drawing Sheets

(56) References Cited

OTHER PUBLICATIONS

Ismail et al., "EATS: Energy-Aware Tasks Scheduling in Cloud Computing Systems," The 6th International Conference on Sustainable Energy Information Technology (SEIT 2016), Procedia Computer Science 83, Dec. 2016, 9 pages.
Salinas-Hilburg et al., "Energy-aware task scheduling in data centers using an application signature," Computers and Electrical Engineering 97 (2022) 107630, Available Online Dec. 8, 2021, 17 pages.
Jejurikar et al., "Energy-Aware Task Scheduling With Task Synchronization for Embedded Real-Time Systems," IEEE Transactions On Computer-Aided Design Of Integrated Circuits and Systems, vol. 25, No. 6, Jun. 2006, 14 pages.

* cited by examiner

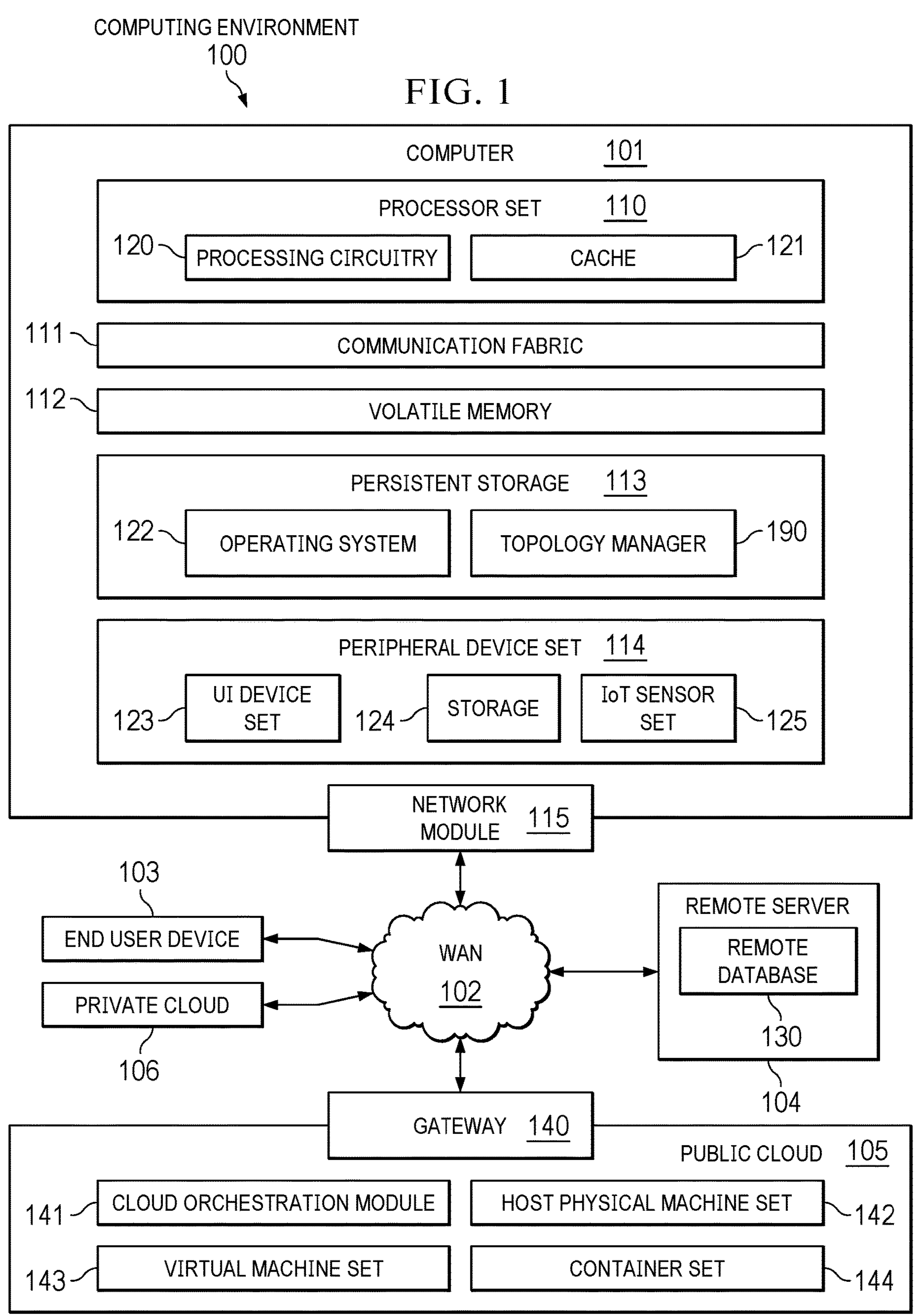
COMPUTING ENVIRONMENT
100
FIG. 1
COMPUTER 101
PROCESSOR SET 110
120
PROCESSING CIRCUITRY
CACHE
121
111
COMMUNICATION FABRIC
112
VOLATILE MEMORY
PERSISTENT STORAGE 113
122
OPERATING SYSTEM
TOPOLOGY MANAGER
190
PERIPHERAL DEVICE SET 114
123
UI DEVICE SET
124
STORAGE
IoT SENSOR SET
125
NETWORK MODULE 115
103
END USER DEVICE
PRIVATE CLOUD
106
WAN
102
REMOTE SERVER
REMOTE DATABASE
130
104
GATEWAY 140
PUBLIC CLOUD 105
141
CLOUD ORCHESTRATION MODULE
HOST PHYSICAL MACHINE SET
142
143
VIRTUAL MACHINE SET
CONTAINER SET
144

700

| TASK A NODE | ENERGY COST (Wh) |
|---|---|
| A1 | 50/50 |
| A2 | 50/50 |
| WINNER | SAME |

702

| TASK B NODE | ENERGY COST (Wh) |
|---|---|
| B1 | 50/100 |
| B2 | 50/100 |
| WINNER | SAME |

704

| TASK C NODE | ENERGY COST (Wh) |
|---|---|
| C1 | 100/200 |
| C2 | 50/150 |
| WINNER | PATH 2 |

706

| TASK D NODE | ENERGY COST (Wh) |
|---|---|
| D1 | 100/300 |
| D2 | 250/400 |
| WINNER | PATH 1 |

708

| TASK E NODE | ENERGY COST (Wh) |
|---|---|
| E1 | 100/400 |
| E2 | 150/550 |
| WINNER | PATH 1 |

710

| TASK F NODE | ENERGY COST (Wh) |
|---|---|
| F1 | 900/1300 |
| F2 | 1400/1950 |
| WINNER | PATH 1 |

| TASK A NODE | ENERGY COST (Wh) |
|---|---|
| A1 | 50/50 |
| A2 | 50/50 |
| WINNER | SAME |

902

| TASK B NODE | ENERGY COST (Wh) |
|---|---|
| B1 | 50/100 |
| B2 | 50/100 |
| WINNER | SAME |

904

| TASK C NODE | ENERGY COST (Wh) |
|---|---|
| C1 | 100/200 |
| C2 | 50/150 |
| WINNER | PATH 2 |

906

| TASK D NODE | ENERGY COST (Wh) |
|---|---|
| D1 | 100/300 |
| D2 | 250/400 |
| WINNER | PATH 1 |

908

| TASK E NODE | ENERGY COST (Wh) |
|---|---|
| E1 DIFFERENT NODES | 100 + 300/700 |
| E2 | 150/550 |
| WINNER | PATH 2 |

910

| TASK F NODE | ENERGY COST (Wh) |
|---|---|
| F1 DIFFERENT NODES | 900 + 400/2000 |
| F2 | 1400/1950 |
| WINNER | PATH 2 |

FIG. 9

DISTRIBUTED COMPUTING TOPOLOGY WITH ENERGY SAVINGS

BACKGROUND

1. Field

The disclosure relates generally to improving a computing system, and more specifically to a method, apparatus, computer system, and computer program product for managing a distributed computing topology for a network computing system.

2. Description of the Related Art

The wide use of computers and the Internet has resulted in concerns of environmental pollution. Computing environments can use large amounts of energy resulting in tons of carbon emissions. For example, in addition to the millions of computers that access the Internet as clients to search for information, perform transactions, exchange emails, perform voice communications, and other actions, the infrastructure also includes computers, storage systems, routers, and other components that consume energy. For example, data centers are constructed with large numbers of network devices that are used to expand network and cloud-based services. These computing devices can be used to provide desired performance when the highest or full utilization of the network occurs.

Peak usage does not occur often leading to many devices being idle and wasting energy. In a similar fashion many client computers and server computers often sit idle consuming energy without processing data.

Much research and effort has been performed to reduce energy usage. Some efforts to reduce energy usage include managing when devices are powered up, suspended, or placed in a sleep mode. Further, network devices such as switches and routers can have communications links turned on and off to control the number of active links. As a result, energy savings can be obtained through these and other power management techniques.

SUMMARY

According to one illustrative embodiment, a computer implemented method manages a topology for a network computing system. A number of processor units determines tasks for a workload to be performed by computing devices in the network computing system. The number of processor units creates the topology for performing the tasks in the workload. The topology comprises nodes representing the tasks assigned to the computing devices. The nodes are connected to each other based on an execution order for the tasks, and the topology has alternative paths for performing the tasks for the workload. The number of processor units determines energy consumption for the alternative paths in the topology. The number of processor units selects a particular path from the alternative paths for performing the tasks for the workload based on the energy consumption for the alternative paths. According to other illustrative embodiments, a computer system and a computer program product for managing a topology or a network computing system are provided.

BRIEF DESCRIPTION OF THE DRAWINGS

FIG. 1 is a block diagram of a computing environment in which illustrative embodiments can be implemented;

FIG. 7 is an illustration of energy consumption for paths in a topology in accordance with an illustrative embodiment;

FIG. 9 is an illustration of energy consumption for paths in a topology in accordance with an illustrative embodiment;

DETAILED DESCRIPTION

Figure 2:
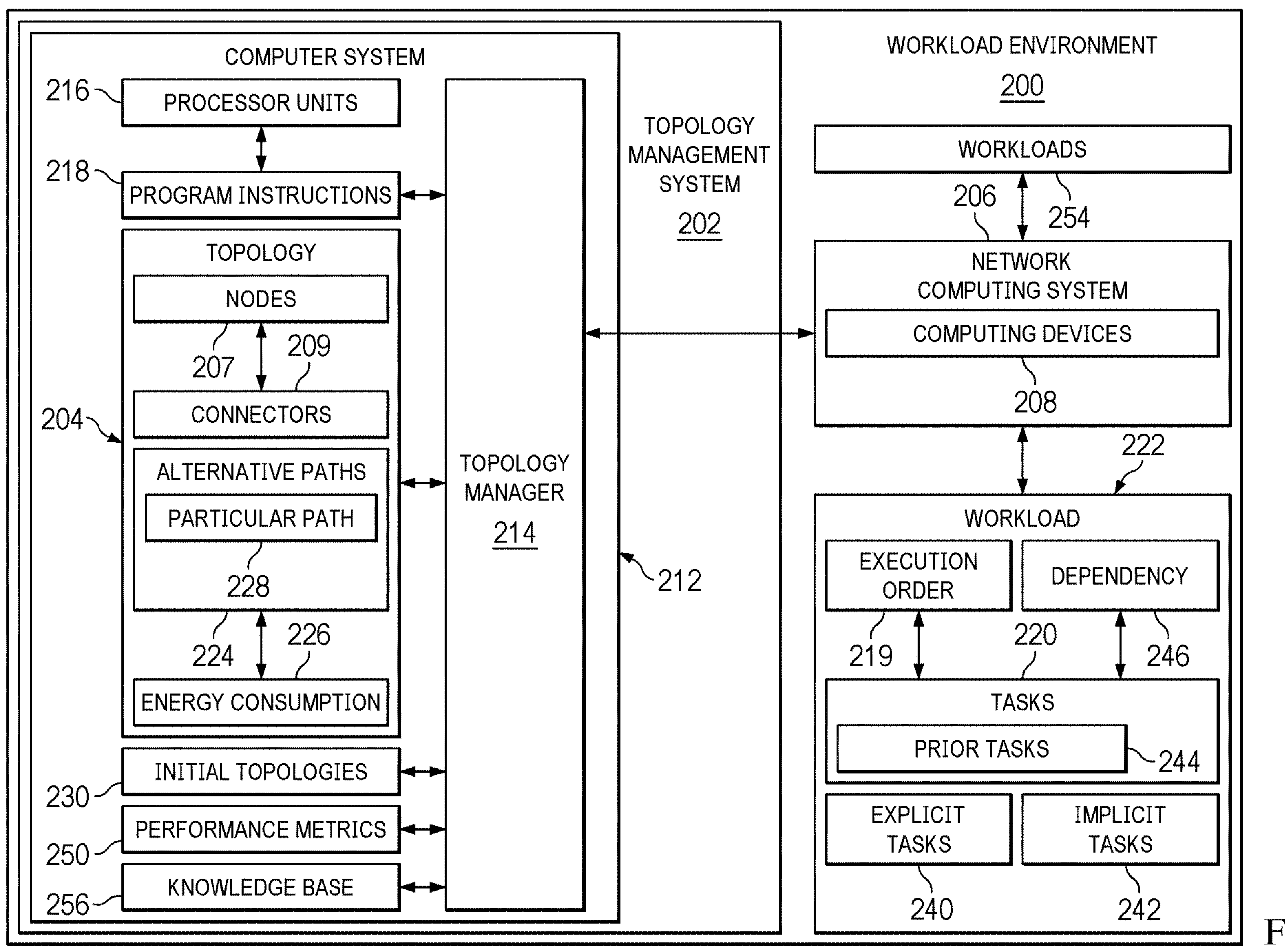
FIG. 2 is block diagram of a workload environment in accordance with an illustrative embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as topology manager 190. In addition to topology manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and topology manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in topology manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in topology manager 190 includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them.

A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different durations as described herein. For example, illustrative embodiments recognize and take into account that although many energy savings techniques are available, it is still challenging to manage energy usage in a dynamic cloud computing environment.

A cloud network includes the main or core network devices and edge devices. In this example, core network devices are computing devices that provide the offer clients services in the cloud network. Core network devices can be example, server computers, network storage systems, and other suitable computing devices in the cloud network.

Edge devices are nodes that have limited energy. Edge devices can be, for example, computing devices such as a sensor, a mobile phone, a thermostat, a laptop computer, or other device that can communicate with other computing devices in a cloud network. As a result. managing energy usage on edge devices can be important because of the limited energy available to these devices.

The illustrative embodiments recognize and take into account that workload processing using nodes that consume less power to perform tasks for a workload is one potential solution for increasing energy efficiency. The selection of workloads to various nodes can be performed in a manner that increases energy efficiency in a network such as a clout network.

A workload is comprised of tasks. Some tasks are explicit tasks while others are implicit tasks. Explicit tasks are tasks in the workload that are always scheduled to be performed. Implicit tasks are tasks that do not currently exist when the workload starts but can occur based on the performance of tasks in the workload.

The illustrative embodiments recognize and take content account that controlling the topology of how the tasks are performed can decrease the energy usage while maintaining a desired level of performance. This desired level performance can be, for example, a user experience and latency in the time to process a request and return a result. The illustrative embodiments can manage the topology for computing devices to perform workloads in a distributed manner that can decrease the amount of power used while maintaining a desired service level objective (SLO). The service level objective can be selected to maintain a desired user experience.

The illustrative embodiments provide a computer implemented method, computer system, and computer program product for managing a topology for a network computing system. A number of processor units determines tasks for a workload to be performed by computing devices in the network computing system. The number of processor units creates the topology for performing the tasks in the workload. The topology comprises nodes representing the tasks assigned to the computing devices. The nodes are connected to each other based on an execution order for the tasks, and the topology has alternative paths for performing the tasks for the workload. The number of processor units determines energy consumption for the alternative paths in the topology. The number of processor units selects a particular path from the alternative paths for performing the tasks for the workload based on the energy consumption for the alternative paths.

With reference now to FIG. 2, a block diagram of a workload environment is depicted in accordance with an illustrative embodiment. In this illustrative example, workload environment 200 includes components that can be implemented in hardware such as the hardware shown in computing environment 100 in FIG. 1.

In this illustrative example, the topology management system 202 can manage the execution of tasks 220 for workload 222 by computing devices 208 in network computing system 206. Network computing system 206 can take a number of different forms. For example, network computing system 206 can be selected from at least one of the Internet, an intranet, a local area network (LAN), a metropolitan area network (MAN), a wide area network (WAN), a cloud network in a cloud computing infrastructure, or other suitable type of network. In this illustrative example, the topology management system 202 comprises computer system 212 and topology manager 214. Topology manager 214 is located in computer system 212.

Topology manager 214 can be implemented in software, hardware, firmware or a combination thereof. When software is used, the operations performed by topology manager 214 can be implemented in program instructions configured to run on hardware, such as a processor unit. When firmware is used, the operations performed by topology manager 214 can be implemented in program instructions and data and stored in persistent memory to run on a processor unit. When hardware is employed, the hardware can include circuits that operate to perform the operations in topology manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as integrated circuits that respond to and process instructions and program instructions that operate a computer. A processor unit can be implemented using processor set 110 in FIG. 1. When the number of processor units 216 execute program instructions 218 for a process, the number of processor units 216 can be one or more processor units that are on the same computer or on different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, topology manager determines tasks 220 for a workload 222 to be performed by computing devices 208 in network computing system 206. Topology manager 214 creates topology 204 for performing tasks 220 in workload 222. In this example, topology 204 comprises nodes 207 representing tasks 220 assigned to computing devices 208 in network computing system 206. Nodes 207 are connected to each other by connectors 209. Connectors 209 indicate a relationship between nodes 207. For example, nodes 207 are connected to each other by connectors 209 based on execution order 219 for tasks 220.

As depicted, topology 204 has alternative paths 224 for performing tasks 220 for workload 222. In this example, alternative paths 224 are different paths through the nodes 207 to perform tasks 220. In other words, more than one path can be present in alternative paths 224 to perform tasks 220 for workload 222. Different paths can be present because different tasks in tasks 220 are assigned to different computing devices in computing devices 208 to perform those tasks.

Topology manager 214 determines energy consumption 226 for alternative paths 224 in topology 204. In these examples, different amounts of energy can be consumed on different paths in alternative paths 224 to perform tasks 220 for workload 222. Different computing devices can be used to perform a particular task. The energy consumed to perform a task can be different for the same task when that task is performed by a different computing device. As a result, energy consumption 226 for different paths in alternative paths 224 to perform tasks 220 for workload 222 can have different levels of energy consumption 226.

In this illustrative example, topology manager 214 selects particular path 228 from alternative paths 224 for performing tasks 220 for workload 222 based on energy consumption 226 for alternative paths 224. With the selection of particular path 228, topology manager 214 can control network computing system 206 to perform tasks 220 for workload 222 using particular path 228 in topology 204. As result, the performance of tasks 220 for workload 222 can be performed using less energy by selecting particular path 228 as a path having the least amount of energy consumption 226 to perform tasks 220 for workload 222 in alternative paths 224.

In this illustrative example, the selection of particular path 228 can also be performed by taking into account other factors in addition to energy consumption 226. For example, meeting service level objectives such as time to perform tasks 220, the use of particular computing devices in computing devices 208, or other factors can be taken into account.

In this illustrative example, in creating topology 204, topology manager 214 can create initial topologies 230 for tasks 220. In this example, a first initial topology in initial topologies 230 comprises nodes 207 for a first path in the alternative paths 224 for performing tasks 220 using a first subset of computing devices 208 that is different from a second initial topology in initial topologies 230 that comprises nodes 207 for a second path in alternative paths 224 for performing tasks 220 using a second subset of computing devices 208. In this illustrative example, an overlap can be present between the first subset of computing devices 208 and the second subset of computing devices 208. For example, both subsets may include some of the same computing devices.

As a result, each of initial topologies 230 can each represent a path in alternative paths 224. In this example, topology manager 214 can combine initial topologies 230 for tasks 220 to form topology 204 with alternative paths 224 for performing tasks 220.

As another example, in creating topology 204 for performing tasks 220 in workload 222, topology manager 214 can identify which of computing devices 208 can perform tasks 220 in workload 222. In this example, a same task in tasks 220 can be performed by different computing devices in computing devices 208. Topology manager 214 can place nodes 207 for the same task assigned to the different computer devices in different paths in alternative paths 224.

In yet another illustrative example, in creating topology 204, topology manager 214 can identify nodes 207 for topology 204 based on explicit tasks 240 for workload 222 and implicit tasks 242 predicted from performing prior tasks 244 in tasks 220 for workload 222. With this example, topology manager 214 can connect nodes 207 for topology 204 to each other based on the execution order 219 for tasks 220 and dependency 246 between tasks 220 to form topology 204.

In this example, dependency 246 between tasks 220 can identify a sequential order in which tasks 220 are performed for workload 222. For example, a task may not be performed until another task has been completed because the task uses the output from the preceding task. In another example, two tasks may be performed in parallel because neither of the two tasks uses the output from the other task.

In the illustrative example, topology manager 214 can determine energy consumption 226 for alternative paths 224 by determining energy consumption 226 for tasks 220 in each of alternative paths 224 in topology 204 based on computing devices 208 assigned to tasks 220. As a result, different paths in alternative paths 224 can have different amounts of energy consumption 226 to perform tasks 220 for performing workload 222.

As another example, topology manager 214 can determine energy consumption 226 for alternative paths 224 by determining energy consumption 226 for tasks 220 in alternative paths 224 in topology 204. Topology manager 214 can determine energy consumption 226 for network communications between sequential tasks in ungrouped nodes in alternative paths 224 in topology 204.

In selecting particular path 228, topology manager 214 can select particular path 228 from alternative paths 224 for performing tasks 220 for workload 222 based on energy consumption 226 for alternative paths 224 and a set performance metrics 250. The performance metrics can be selected from a group consisting of at least one of a response time, uptime, resource use, preference to use edge devices, or other metrics.

Further, topology manager 214 can analyze the performance of workloads 254 by computing devices 208 in network computing system 206. Topology manager 214 can generate knowledge base 256 for workloads 254. In this illustrative example, knowledge base 256 can include metadata describing a computing device, an amount of energy consumption to perform a task for each task in workloads 254. Knowledge base 256 can be used to determine the energy consumption for the tasks in the workloads that are to be performed by computing devices 208 and network computing system 206.

Thus, in one or more illustrative examples, workload processing can occur in a manner that reduces the amount of energy used to process the workloads through the selection of computing devices to perform tasks for the workloads. In the illustrative examples, topology management is used to create a topology defining the relationship of tasks in a workload based on the sequential execution of the tasks to perform a workload. The topology also includes alternative paths in which the tasks can be performed by different computing devices. This topology can be analyzed to identify a particular path in the alternative paths that provides a desired level of energy consumption. Additionally, other performance metrics can be considered to provide a desired user experience for users of services that perform these workloads.

With the selection of a path in the topology to perform the task for the workloads, the task can be scheduled for performance in a manner that reduces energy and can also meet other performance metrics. This type of topology management can reduce the energy costs for various network computing systems including those containing cloud computing environments.

In the illustrative example, computer system 212 can be configured to perform at least one of the steps, operations, or actions described in the different illustrative examples using software, hardware, firmware or a combination thereof. As a result, computer system 212 operates as a special purpose computer system in which topology manager 214 in computer system 212 enables managing the performance of tasks in a network computing system that reduces energy usage. In particular, topology manager 214 transforms computer system 212 into a special purpose computer system as compared to currently available general computer systems that do not have topology manager 214.

In the illustrative example, the use of topology manager 214 in computer system 212 integrates processes into a practical application of a topology of a network computing system in which the topology identifies tasks assigned to computing devices in the network computing system to perform the tasks for a workload. In the illustrative example, the topology has multiple paths to perform the tasks for workload. Each path can have a different subset of the computing devices as compared to other paths for performing the tasks. Topology manager 214 identifies energy consumption for performing the tasks in the workload along each path in the topology. The topology manager 214 can select the path in the paths in the topology that provides the lowest energy consumption to perform the tasks for the workload. Additionally, topology manager 214 can also take into account other performance metrics in addition to reducing energy consumption in selecting a path in the paths in the topology. In this manner, topology manager 214 in computer system 212 provides a practical application of managing typologies for performing tasks for workload in a network data processing system.

Figure 3:
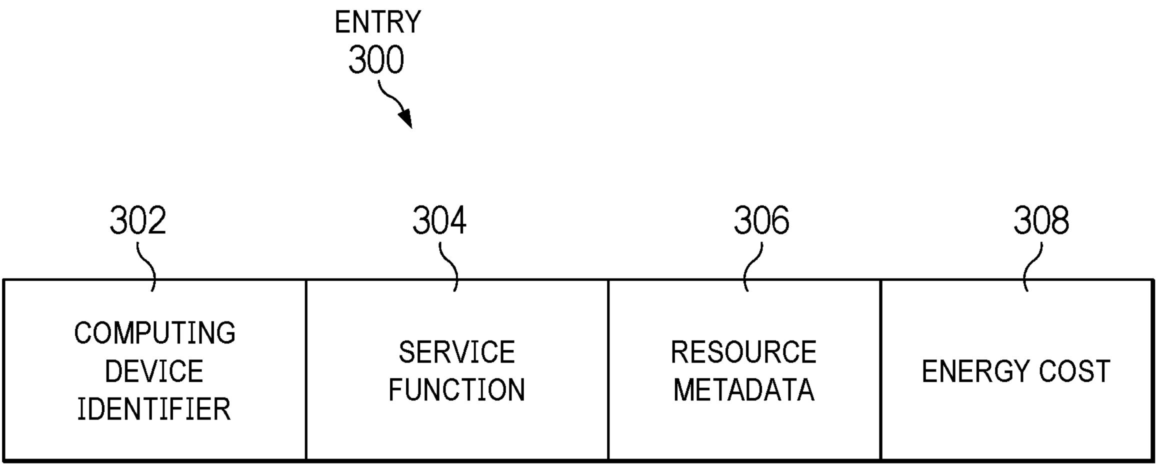
FIG. 3 is an illustration of information in a knowledge base in accordance with an illustrative embodiment.

Turning now to FIG. 3, an illustration of information in a knowledge base is depicted in accordance with an illustrative embodiment. As depicted, entry 300 is an example of an entry for a computing device in knowledge base 256 in FIG. 2. As depicted, entry 300 comprises computing device identifier 302, service function 304, resource metadata 306, and energy cost 308.

Computing device identifier 302 uniquely identifies a computing device that can be used to perform tasks. Service function 304 identifies one or more tasks that the computing device can perform. Resource metadata 306 identifies information about the computing device. Resource metadata 306 can include, for example, a processor type, a memory type, an amount of memory, and other information about the computing device.

Energy cost 308 identifies the cost to perform a task. In this example, the energy costs can be in kilowatts per hour. Energy cost 308 can include the value for each task. Further, energy cost 308 can also provide energy costs for different conditions such as higher or lower volumes of prime data being processed.

The illustration of entry 300 is presented as an example of one manner in which information can be structured in knowledge base 256. This example is not meant to limit the manner in which entries can be implemented in other implementations. For example, other information such as conditions for using the computing device to perform a task can be included in other examples.

Figure 4:
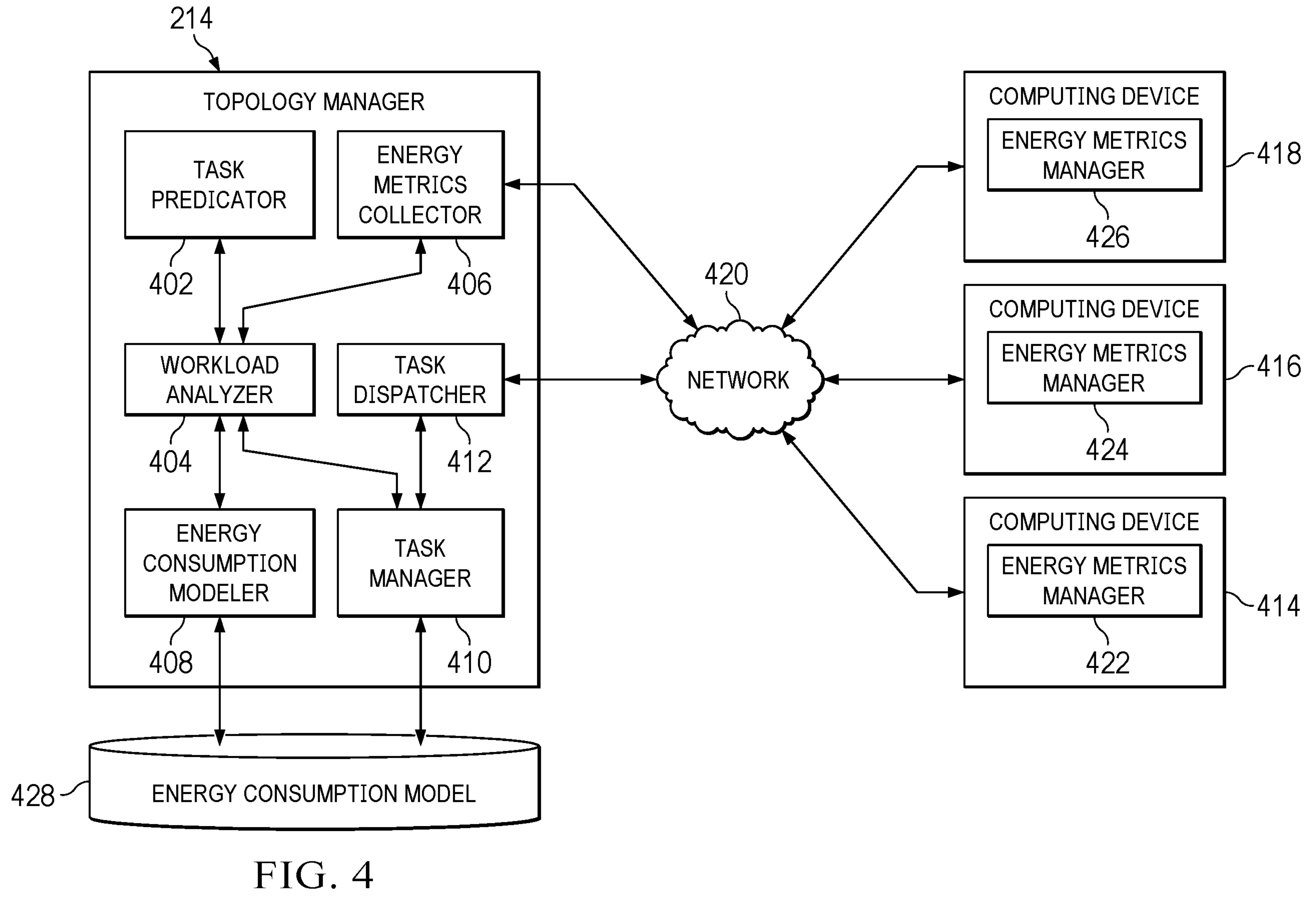
FIG. 4 is an illustration of a topology manager in accordance with an illustrative embodiment.

Turning next to FIG. 4, illustration of a topology manager is depicted in accordance with an illustrative embodiment. An example of components that can be used in topology manager 214 are depicted in this figure. In the illustrative examples, the same reference numeral may be used in more than one figure. This reuse of a reference numeral in different figures represents the same element in the different figures.

In this example, topology manager 214 comprises a number of different components. As depicted, task predictor 402 includes workload analyzer 404, energy metrics collector 406, energy consumption modeler 408, task manager 410, and task dispatcher 412.

In this illustrative example, the topology manager 214 communicates with computing device 414, computing device 416, and computing device 418 over network 420. In this example, computing device 414 includes energy metrics manager 422; computing device 416 includes energy metrics manager 424; and computing device 418 includes energy metrics manager 426. These energy metrics managers are software components that can collect information about energy consumption that occurs during the execution of tasks by these computing devices. This information can be sent back to energy metrics collector 406 over network 420.

Energy metrics collector 406 sends information to workload analyzer 404. In response to receiving the information, workload analyzer 404 can use energy consumption modeler 408 to create and update energy consumption model 428. This model is an example of a knowledge base that can be used to provide information of energy consumption to perform tasks by various computing devices.

In managing the performance of tasks for a workload, workload analyzer 404 can receive a workload with an identification of explicit tasks that are known for performance of the workload. Explicit tasks are tasks that are identified in the workflow and are scheduled to be performed.

In these examples, implicit tasks can also be present for the workload. An implicit task is a task that does not exist in the workflow for a specific workload but can be performed based on the results performing other tasks for various conditions that may be present during the performance of explicit tasks or other implicit tasks.

Workload analyzer 404 can use task predictor 402 to predict tasks that may be performed based on the results of the explicit tasks or conditions occurring during processing of tasks. These predicted tasks can be referred to as implicit tasks. Workload analyzer 404 can create a topology containing explicit tasks and implicit tasks with multiple paths for performing these tasks using different computing devices. The selection of computing devices for particular tasks can depend on whether those computing devices can perform those particular tasks.

Further, workload analyzer can use energy consumption model 428 to identify energy consumption for performing both explicit tasks and implicit tasks for each of the tasks in a topology. Energy consumption can be used to select a particular path in the topology for performing the tasks for the workload.

Based on the selection of a particular path within the topology, workload analyzer 404 can use task manager 410 to assign tasks to computing devices such as computing device 414, computing device 416, and computing device 418 to perform tasks for the workload. Based on this assignment of tasks, task dispatcher 412 can dispatch tasks to the computing devices over network 420 to perform the tasks for the workload.

This illustration of topology manager 214 and the computing devices is provided as an example of one implementation for topology manager 214 and computing devices 208 in FIG. 2. This illustration is not meant to limit the manner in which other illustrative examples can be implemented. For example, in other illustrative examples, energy metrics collector 406 may be omitted when topology manager 214 does not create or update energy consumption model 428. In another illustrative example, the dispatching of task can be included as part of task manager 410. In yet other illustrative examples, other numbers of computing devices can be present in addition to the three computing devices is shown in this example.

The illustration of workload environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, topology manager 214 can operate to manage one or more network computing systems in addition to or in place of network computing system 206.

In yet other illustrative examples, topology manager 214 can manage one or more typologies in addition to topology 204 to perform tasks for additional workloads in addition to tasks 220 for workload 222 in network computing system 206.

Figure 5:
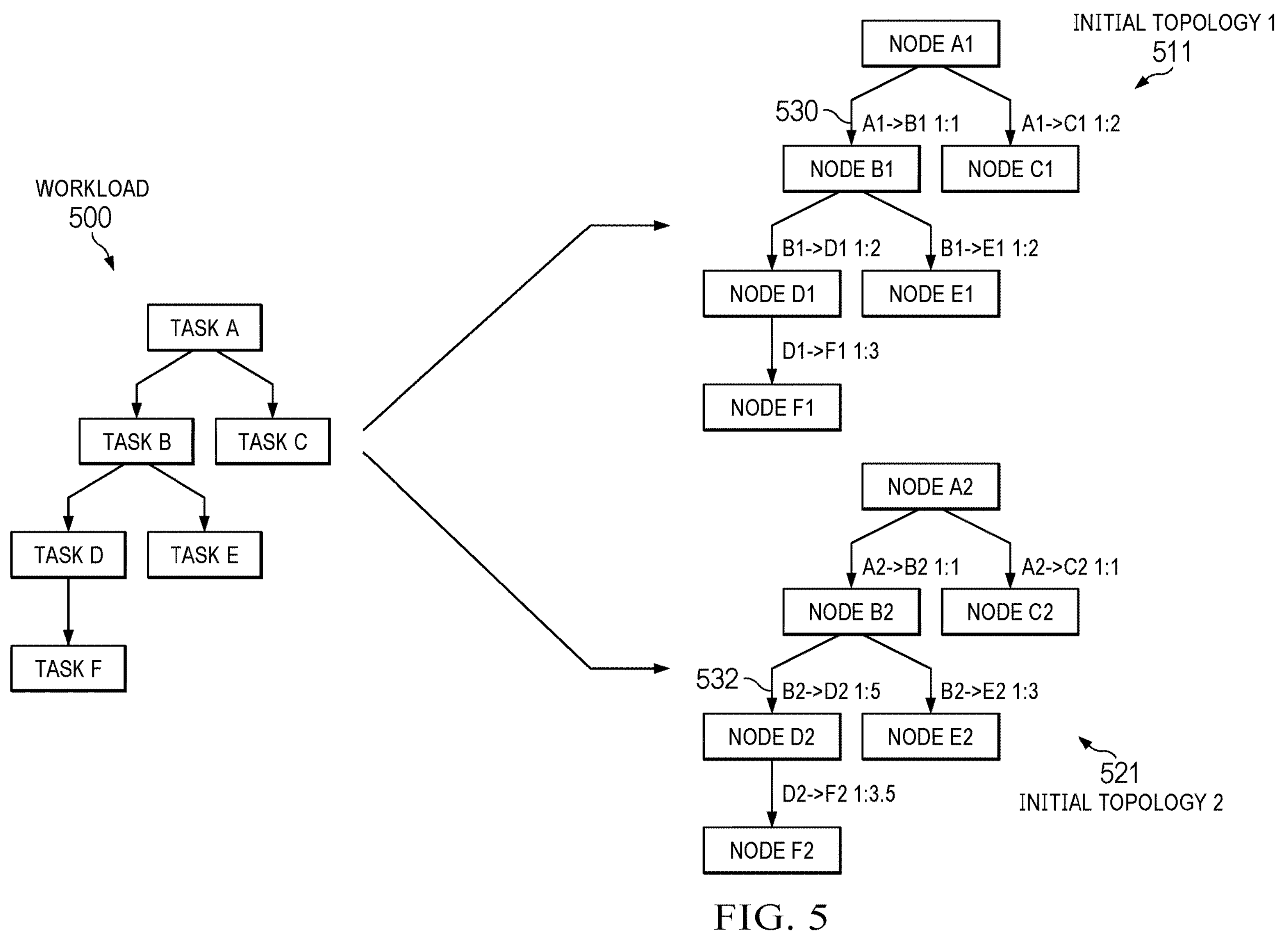
FIG. 5 is an illustration of generating a topology for performing tasks in a workload in accordance with an illustrative embodiment.

Turning now to FIG. 5, an illustration of generating a topology for performing tasks in a workload is depicted in accordance with an illustrative embodiment. In this example, workload 500 comprises six nodes for tasks in workload 500. In this example, the nodes are task A, task B, task C, task D, task E, and task F with each node corresponding to one of the six tasks for workload 500.

Initial topology 1 511 and initial topology 2 521 are examples of initial topologies 230 in FIG. 2. Each of these initial topologies is a path that can be used to perform the tasks. In this example, initial topology 1 511 and initial topology 2 521 use different subsets of computing devices in a network computing system to perform the tasks for workload 500. In other words, these two initial topologies are examples of alternative paths 224 in FIG. 2 when these two initial topologies are combined into a single topology.

As depicted, initial topology 1 511 comprises nodes labeled node A1, node B1, node C1, node D1, node E1, and node F1 that represent tasks assigned to computing devices to perform for performing for workload 500. Initial topology 2 521 comprises nodes labeled node A2, node B2, node C1, node D1, node E2, and node F2 that represent tasks assigned to computing devices for performing workload 500.

As depicted in this example, the task identifiers identify a particular task from workload 500 with indicating particular computing device. For example, the node labeled "node A1" in initial topology 1 511 and the node labeled "node A2" in the initial topology 2 521 both correspond to Task A in workload 500 but are performed using different computing devices. For example, node A1 is Task A performed using an x86 central processing unit while node A2 is Task A performed using a z15 central processing unit.

In this example, initial topology 1 511 and initial topology 2 521 also include edges that provide information about the processing of data by the tasks. These edges indicate the amounts of input and output of data as ratios. For example, edge 530 in initial topology 1 511 connects node A1 to node B1. This edge has a ratio of 1:1 the amount of input data is equal to the amount of output data. As another example, edge 532 in initial topology 2 521 connects node B2 to node D2. This edge has a ratio of 1:5, which indicates that five times the amount of output data is generated for an amount of input data in node B2. In this example, these initial typologies can be combined into a single topology to form a topology such as topology 204 in FIG. 2.

Figure 6:
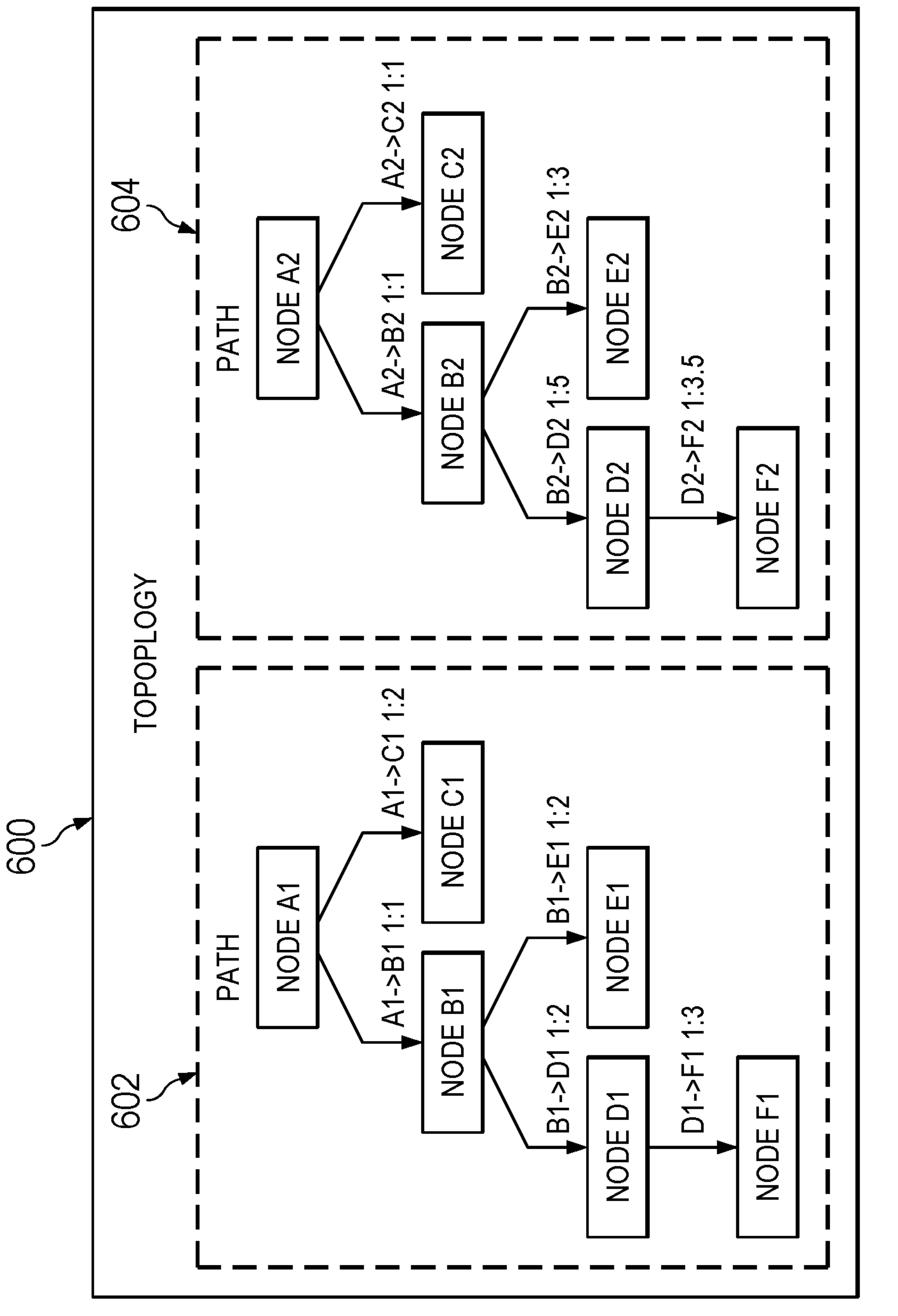
FIG. 6 is an illustration of a topology in accordance with an illustrative embodiment.

Turning next to FIG. 6, an illustration of a topology is depicted in accordance with an illustrative embodiment. As depicted, topology 600 is formed from initial topology 1 511 and initial topology 2 521. Topology 600 comprises path 602 and path 604. In this example, initial topology 1 511 forms path 1 602 and initial topology 2 521 forms path 2 604. In this example, the energy consumption for each of these paths can be analyzed to performing the tasks for the workload.

With reference now to FIG. 7, an illustration of energy consumption for paths in a topology is depicted in accordance with an illustrative embodiment. In this depicted example, energy consumption for performing a workload comprising Task A, Task B, Task C, Task D, Task E, and Task F is depicted. In this example, this workload can be performed using a topology having two paths, path 1 and path 2. In this example path 1 comprises nodes A1, B1, C1, D1, E1, F1 in the order of task performance. Path 2 comprises nodes A2, B2, C2, D2, E2, F2 in the order of task performance. The labels for the nodes in these two paths correspond to the tasks for the workload. For example, A1 and A2 correspond to Task A in which A1 uses a different computing device from A2.

The energy consumption for each task in the two paths for performing the workload are shown in the tables. Each of the tables identifies a node for each path, energy cost to perform the task, and a total energy cost that includes energy use from any previously performed tasks in the path. The tables also indicate which path has a lower energy cost at that node in the path.

As depicted, table 700 shows energy consumption to perform Task A using A1 in path 1 and using A2 in path 2. As depicted for Task A, A1 and A2 both have an energy cost of 50 Wh. In this example, the energy is in watt hours. The cumulative energy costs for each path is 50 Wh. Table 700 indicates neither path has a lower energy cost.

Table 702 illustrates energy consumption to perform Task B using B1 in path 1 and using B2 in path 2. In this example, both B1 and B2 have an energy cost of 50 Wh to perform Task B. The cumulative energy cost for both paths is 100 Wh. Neither path has a lower energy cost in this example.

Next, table 704 illustrates energy consumption to perform Task C using C1 in path 1 and using C2 in path 2. In this example, C1 has an energy cost of 100 Wh and C2 has an energy cost of 50 Wh to perform Task C. The cumulative energy cost is 200 Wh for path 1 and 150 Wh for path 2. Path 2 has a lower energy cost at this point in task processing.

Table 706 illustrates energy consumption to perform Task D using D1 in path 1 and using D2 in path 2. In this example, D1 has an energy cost of 100 Wh and D2 has an energy cost of 250 Wh to perform Task D. The cumulative energy cost for path 1 is 300 Wh and the cumulative energy cost for path 2 is 400 Wh. Path 1 has a lower energy cost in this example.

In this example, table 708 illustrates energy consumption to perform Task E using E1 in path 1 and using E2 in path 2. In this example, E1 has an energy cost of 100 Wh and E2 has an energy cost of 150 Wh to perform Task E. The cumulative energy cost for path 1 is 400 Wh and the cumulative energy cost for path 2 is 550 Wh. Path 1 still has a lower energy cost in this example.

Table 710 illustrates energy consumption to perform Task F using F1 in path 1 and using F2 in path 2. In table 710, F1 has an energy cost of 900 Wh and F2 has an energy cost of 1400 Wh to perform Task F. The cumulative energy cost for path 1 is 1300 Wh and the cumulative energy cost for path 2 is 1950 Wh. Path 1 has an overall lower energy cost in this example.

Figure 8:
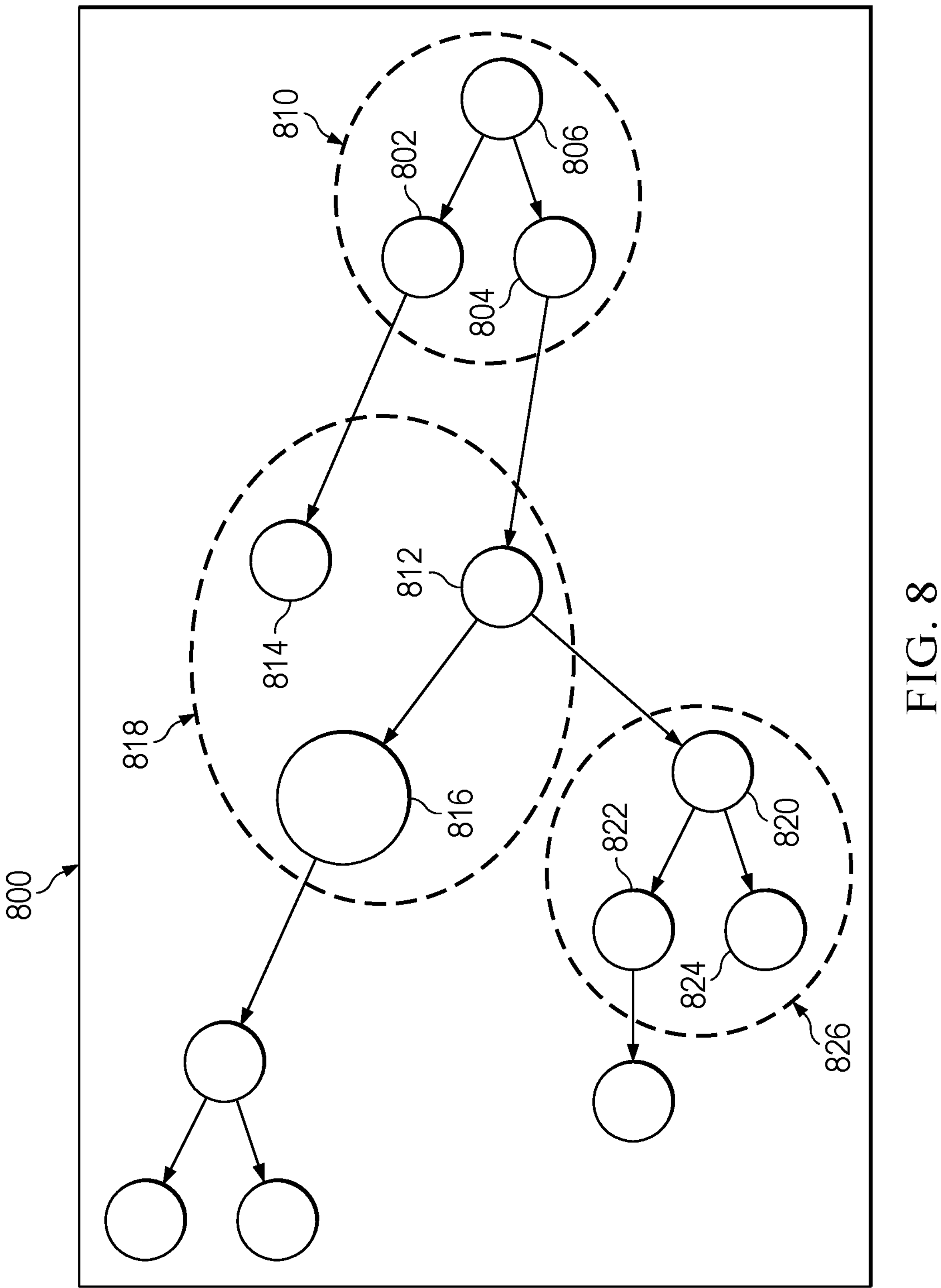
FIG. 8 is an illustration of a topology containing nodes with task affinity in accordance with an illustrative embodiment.

Turning now to FIG. 8, an illustration of a topology containing nodes with task affinity is depicted in accordance with an illustrative embodiment. As depicted, topology 800 is an example of topology 204 in FIG. 2. In this example, task affinity is present between some of the tasks in topology 800.

Task affinity between two tasks means that the two tasks can be performed on the same computing device. With task affinity, energy cost for sending information from a first task to a second task does not occur. When the two tasks are scheduled on different computing devices, an energy cost can be incurred to send information from the first task to the second task.

As depicted, task 802, task 804, and task 806 can be performed on the computing device 810. These tasks have task affinity because they are performed on the same computing device. In other words, when task 806 sends information to task 802 and task 804, an energy cost is not incurred for sending the information to these two tasks from task 806 because the information is not sent from one computing device to another computing device.

As another example, task 812, task 814, and task 816 can be performed on the computing device 818. In this example, an energy cost is not incurred from task 812 to send information to task 814 and task 816 because these three tasks are performed on computing device 818.

As depicted, task 820, task 822, and task 824 can be performed on computing device 826. In this example, an energy cost is not incurred for task 820 to send information to task 822 and task 824 because these three tasks are performed on computing device 826.

When task 804 sends information to task 812, an energy cost is incurred because these two tasks are performed on different computing devices. As another example, when task 812 sends information to task 820, and energy costs can also be incurred for sending information from one computing device to another computing device. An energy cost is incurred from the sending of the information over a connection between computing devices. These energy costs can also be taken into account in selecting a particular path in topology 800 to perform tasks for a workload.

In the illustrative examples, node affinity can be taken into account in determining energy consumption for performing tasks for a workload. When sequential tasks cannot be scheduled on the same computing device, an energy cost is also present for sending data from one computing device to another computing device.

With reference now to FIG. 9, an illustration of energy consumption for paths in a topology is depicted in accordance with an illustrative embodiment. In this depicted example, energy consumption for performing a workload comprising Task A, Task B, Task C, Task D, Task E, and Task F is depicted. In this example, this workload can be performed using a topology having two paths, path 1 and path 2. In this example path 1 comprises nodes A1, B1, C1, D1, E1, F1 in the order of task performance. Path 2 comprises nodes A2, B2, C2, D2, E2, F2 in the order of task performance. The labels for the nodes in these two paths correspond to the tasks for the workload. For example, A1 and A2 correspond to Task A in which A1 uses a different computing device from A2.

The energy consumption for each task in the two paths for performing the workload are shown in the tables in this FIG. 9. Each of the tables in this figure identifies for each path a node, an energy cost to perform the task, and a total energy cost that includes energy use from any previously performed tasks in the path. The tables also indicate which path has a lower energy cost at that point in the path. These tables also take into account energy consumption when a task is performed on a different node from a preceding task in the path.

As depicted, table 900 shows energy consumption to perform Task A using A1 in path 1 and using A2 in path 2. As depicted, Task A1 and A2 both have an energy cost of 50

Wh. In this example, the energy is in watt hours. The cumulative energy costs for each path is 50 Wh. Table 900 indicates neither path has a lower energy cost.

Table 902 illustrates energy consumption to perform Task B using B1 in path 1 and using B2 in path 2. In this example, both B1 and B2 have an energy cost of 50 Wh to perform Task B. The cumulative energy cost for both paths is 100 Wh. Neither path has a lower energy cost in this example.

Next, table 904 illustrates energy consumption to perform Task C using C1 in path 1 and using C2 in path 2. In this example, C1 has an energy cost of 100 Wh and C2 has an energy cost of 50 Wh to perform Task C. The cumulative energy cost for is 200 Wh for path 1 and 150 Wh for path 2. Path 2 has a lower energy cost at this point in task processing.

Table 906 illustrates energy consumption to perform Task D using D1 in path 1 and using D2 in path 2. As depicted, D1 has an energy cost of 100 Wh and D2 has energy cost of 250 Wh to perform Task D. The cumulative energy cost for path 1 is 300 Wh and the cumulative energy cost for path 2 is 400 Wh. Path 1 has a lower energy cost in this example.

In this example, table 908 illustrates energy consumption to perform Task E using E1 in path 1 and using E2 in path 2. In this example, E1 has an energy cost of 100 Wh. In this example, the performance of Task E using E1 occurs with Task D occurring on a different computing device from performing Task E. As a result, an additional energy cost of 300 Wh is present. E2 has energy cost of 150 Wh to perform Task E.

The cumulative energy cost of path 1 is 700 Wh and the cumulative energy cost for path 2 is 550 Wh. Path 2 still has a lower energy cost in this example.

Table 910 illustrates energy consumption to perform Task F using F1 in path 1 and using F2 in path 2. In this example, F1 has an energy cost of 900 Wh. Additionally, performing Task F using F1 results in an additional energy cost of 400 because Task F is performed on a different computing device from Task E. F2 has an energy cost of 1400 Wh to perform Task F.

The cumulative energy cost for path 1 is 2000 Wh and the cumulative energy cost for path 2 is 1950 Wh. In this example, path 2 has an overall lower energy cost in this example.

As can be seen in this example in FIG. 9, energy costs for sending information from one computing device to another computing device can be used to determine an overall lowest energy cost for a particular path. In this example, path 1 involved processing tasks on different computing devices while path 2 involved processing all of the tasks on the same computing device.

Figure 10:
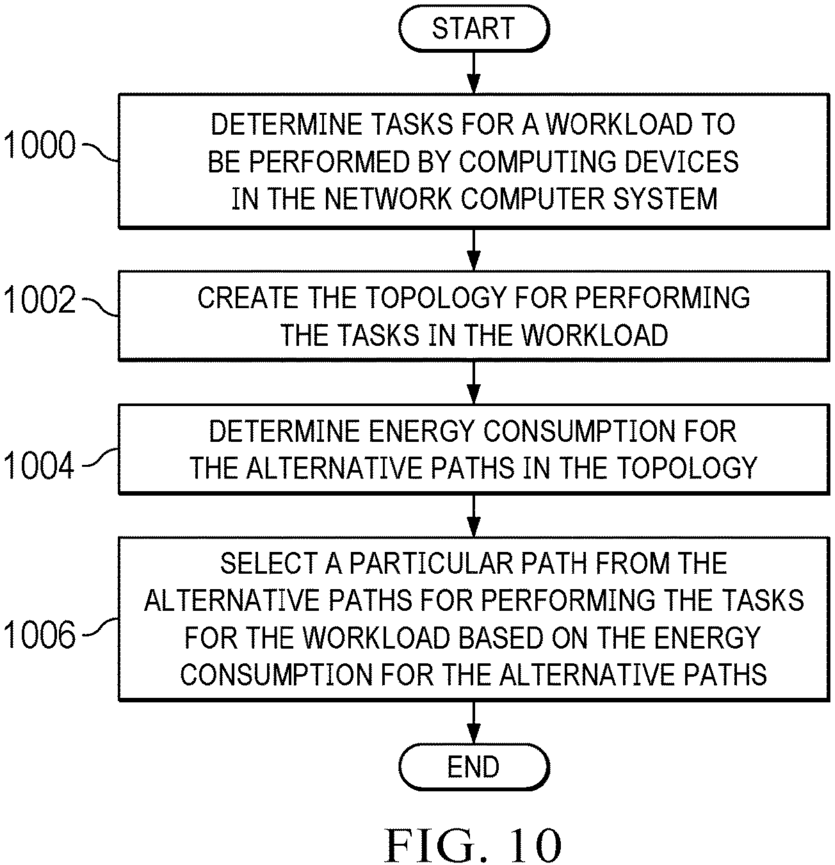
FIG. 10 is a flowchart of a process for managing a topology for a network computing system in accordance with an illustrative embodiment.

Turning next to FIG. 10, a flowchart of a process for managing a topology for a network computing system is depicted in accordance with an illustrative embodiment. The process in FIG. 10 can be implemented in hardware, software, or both. When implemented in software, the process can take the form of program instructions that is run by one of more processor units located in one or more hardware devices in one or more computer systems. For example, the process can be implemented in topology manager 214 in computer system 212 in FIG. 2.

The process begins by determining tasks for a workload to be performed by computing devices in the network computer system (step 1000).

The process creates a topology for performing the tasks in the workload (step 1002). In this example, the topology comprises nodes representing the tasks assigned to the computing devices. The nodes are connected to each other based on an execution order for the tasks, and the topology has alternative paths for performing the tasks for the workload. The process determines energy consumption for the alternative paths in the topology (step 1004).

The process selects a particular path from the alternative paths for performing the tasks for the workload based on the energy consumption for the alternative paths (step 1006). The process terminates thereafter.

In these examples, the determination of tasks for workload in step 1000 can include predicting implicit tasks that may arise from performing tasks for the workload. When implicit tasks are included, the determination of the energy consumption also include the energy consumed by the implicit tasks. In this depicted example, the energy consumption based of implicit tasks and the explicit task can be used to determine the particular path from the alternative paths.

Figure 11:
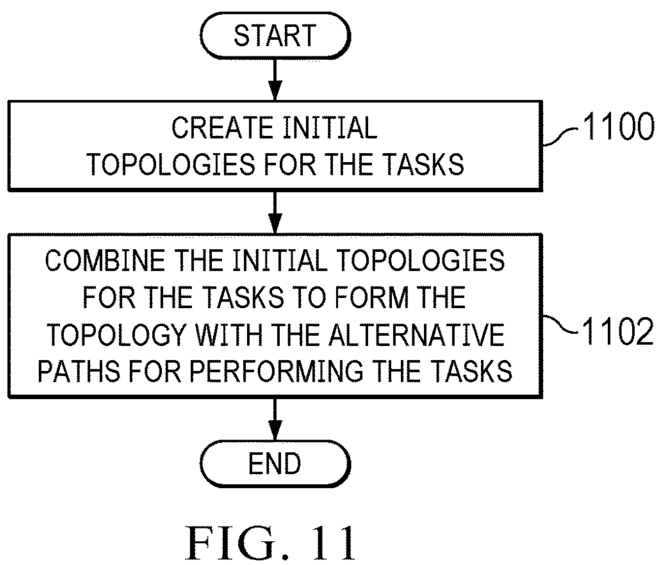
FIG. 11 is a flowchart of a process for creating a topology for tasks in a workload in accordance with an illustrative embodiment.

With reference next to FIG. 11, a flowchart of a process for creating a topology for tasks in a workload is depicted in accordance with an illustrative embodiment. The process in FIG. 11 is an example of one implementation for step 1002 in FIG. 10.

The process begins by creating initial topologies for the tasks (step 1100). In this illustrative example, a first initial topology in the initial topologies comprises the nodes for a first path in the alternative paths for performing the tasks using a first subset of the computing devices that is different from a second initial topology in the initial topologies. The second initial topology comprises the nodes for a second path in the alternative paths for performing the tasks using a second subset of the computing devices.

The process combines the initial topologies for the tasks to form the topology with the alternative paths for performing the tasks (step 1102). The process terminates thereafter.

Figure 12:
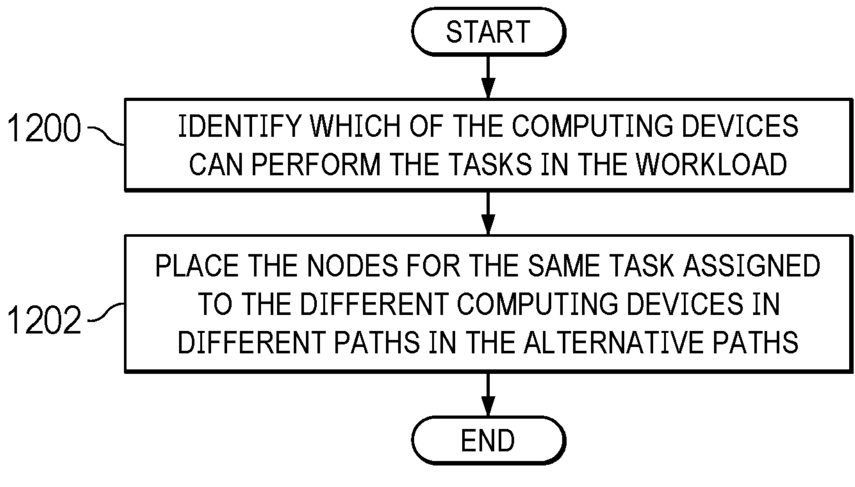
FIG. 12 is a flowchart of a process for creating a topology for tasks in a workload in accordance with an illustrative embodiment.

With reference next to FIG. 12, a flowchart of a process for creating a topology for tasks in a workload is depicted in accordance with an illustrative embodiment. The process in FIG. 12 is an example of one implementation for step 1002 in FIG. 10.

The process begins by identifying which of the computing devices can perform the tasks in the workload (step 1200). In this illustrative example, a same task in the tasks can be performed by different computing devices in the computing devices. The process places the nodes for the same task assigned to the different computing devices in different paths in the alternative paths (step 1202). The process terminates thereafter.

Figure 13:
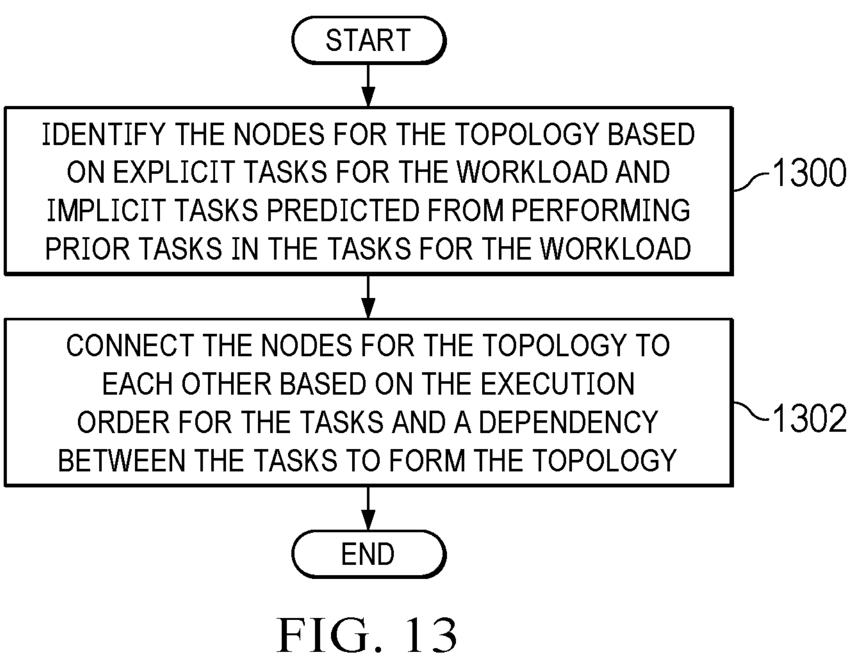
FIG. 13 is a flowchart of a process for creating a topology for tasks in a workload in accordance with an illustrative embodiment.

Turning to FIG. 13, a flowchart of a process for creating a topology for tasks in a workload is depicted in accordance with an illustrative embodiment. The process in FIG. 13 is an example of one implementation for step 1002 in FIG. 10.

The process begins by identifying the nodes for the topology based on explicit tasks for the workload and implicit tasks predicted from performing prior tasks in the tasks for the workload (step 1300). The process connects the nodes for the topology to each other based on the execution order for the tasks and a dependency between the tasks to form the topology (step 1302). In this example, the topology has alternative paths for performing the tasks for the workload. The process terminates thereafter.

With the predicting implicit tasks that can occur from the execution of tasks, these implicit tasks can also be considered in determining energy consumption and selecting a particular path within the topology to perform tasks for the workload.

Figure 14:
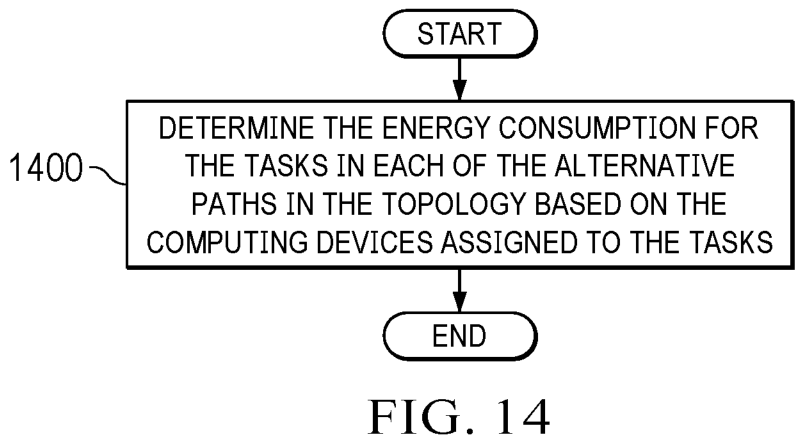
FIG. 14 is a flowchart of a process for determining energy consumption for alternative paths in a topology in accordance with an illustrative embodiment.

Turning next to FIG. 14, a flowchart of a process for determining energy consumption for alternative paths in a topology is depicted in accordance with an illustrative embodiment. The process in FIG. 14 is an example of one implementation for step 1004 in FIG. 10. The process determines the energy consumption for the tasks in each of the alternative paths in the topology based on the computing devices assigned to the tasks (step 1400). The process terminates thereafter.

Figure 15:
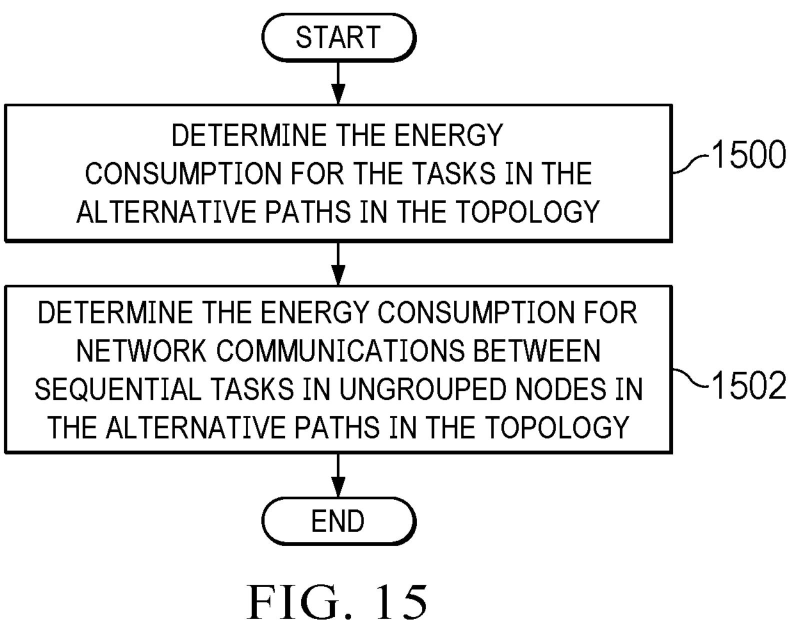
FIG. 15 is a flowchart of a process for determining energy consumption for alternative paths in accordance with an illustrative embodiment.

With reference to FIG. 15, a flowchart of a process for determining energy consumption for alternative paths in a topology is depicted in accordance with an illustrative embodiment. The process in FIG. 15 is an example of one implementation for step 1004 in FIG. 10.

The process begins by determining the energy consumption for the tasks in the alternative paths in the topology (step 1500). The process determines the energy consumption for network communications between sequential tasks in ungrouped nodes in the alternative paths in the topology (step 1502). The process terminates thereafter.

Figure 16:
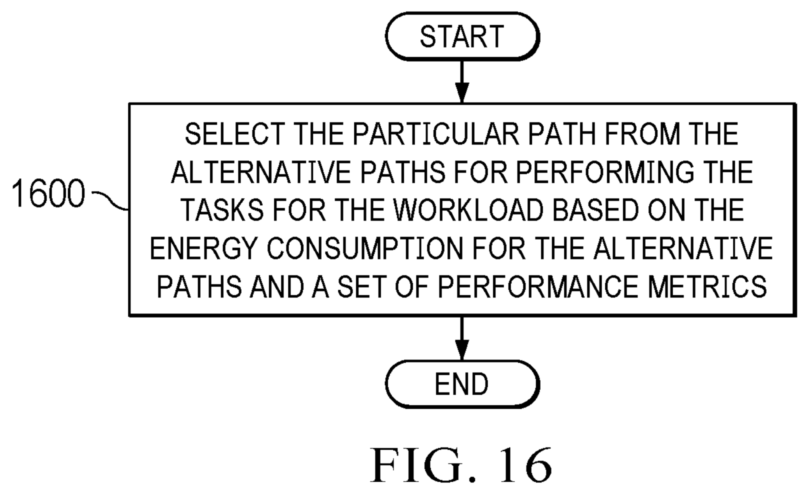
FIG. 16 is a flowchart of a process for selecting a particular path from alternative paths in accordance with an illustrative embodiment.

Turning to FIG. 16, a flowchart of a process for selecting a particular path from alternative paths is depicted in accordance with an illustrative embodiment. The process in FIG. 16 is an example of one implementation for step 1006 in FIG. 10. The process selects the particular path from the alternative paths for performing the tasks for the workload based on the energy consumption for the alternative paths and a set performance metrics (step 1600). The process terminates thereafter.

Figure 17:
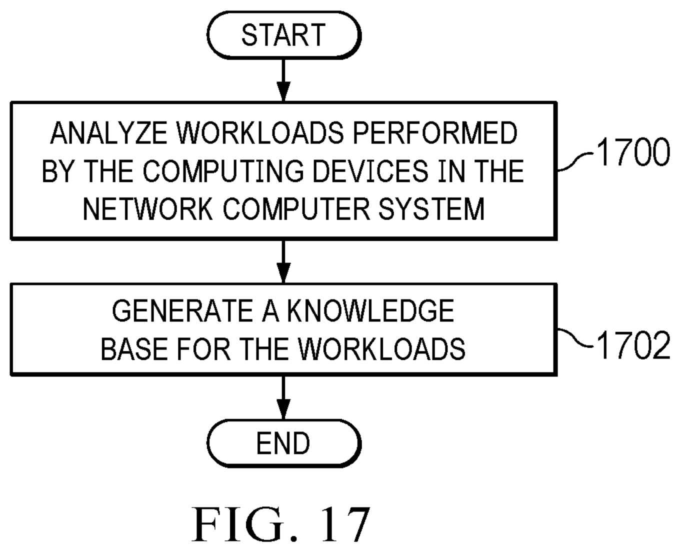
FIG. 17 is a flowchart of a process for generating a knowledge base for workloads in accordance with an illustrative embodiment.

With reference next to FIG. 17, a flowchart of a process for generating a knowledge base for workloads is depicted in accordance with an illustrative embodiment. The process in FIG. 17 is an example of additional steps that can be performed with the steps in FIG. 10.

The process begins by analyzing workloads performed by the computing devices in the network computer system (step 1700). The process generates a knowledge base for the workloads (step 1702). The process terminates thereafter.

In this example, the knowledge base includes for each task in the workloads a context, an input, an output, a condition, and the energy consumption based on the computing devices performing the task, wherein the knowledge base is used to determine the energy consumption for the tasks in the workloads. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 18:
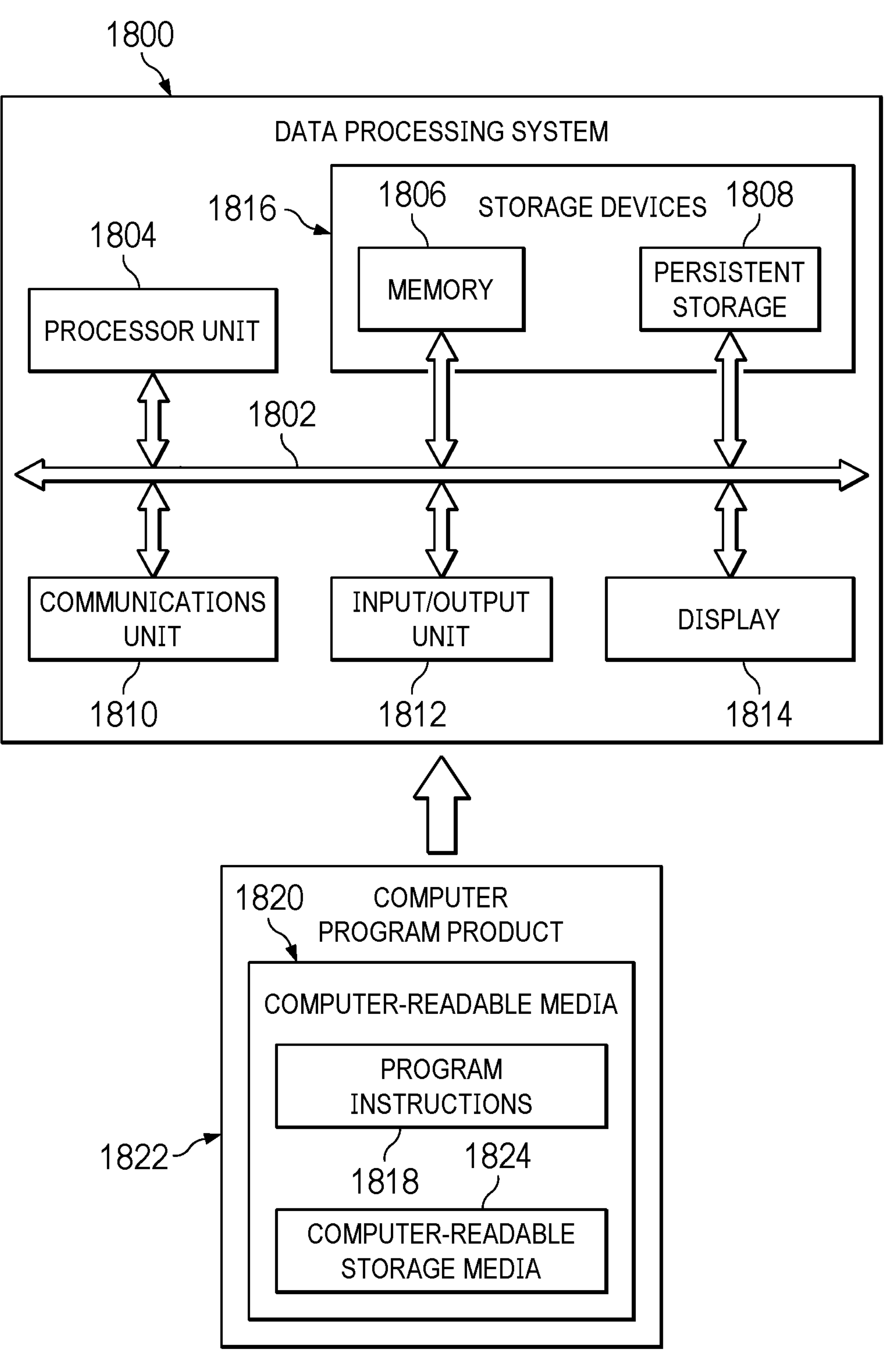
FIG. 18 is a block diagram of a data processing system in accordance with an illustrative embodiment.

Turning now to FIG. 18, a block diagram of a data processing system is depicted in accordance with an illustrative embodiment. Data processing system 1800 can be used to implement computers and computing devices in computing environment 100 in FIG. 1. Data processing system 1800 can also be used to implement computer system 212, computing devices 208 in network computing system 206 in FIG. 2. In this illustrative example, data processing system 1800 includes communications framework 1802, which provides communications between processor unit 1804, memory 1806, persistent storage 1808, communications unit 1810, input/output (I/O) unit 1812, and display 1814. In this example, communications framework 1802 takes the form of a bus system.

Processor unit 1804 serves to execute instructions for software that can be loaded into memory 1806. Processor unit 1804 includes one or more processors. For example, processor unit 1804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1804 can may be implemented using one or more heterogeneous processor systems in which a main processor is present with secondary processors on a single chip. As another illustrative example, processor unit 1804 can be a symmetric multi-processor system containing multiple processors of the same type on a single chip.

Memory 1806 and persistent storage 1808 are examples of storage devices 1816. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1816 may also be referred to as computer-readable storage devices in these illustrative examples. Memory 1806, in these examples, can be, for example, a random-access memory or any other suitable volatile or non-volatile storage device. Persistent storage 1808 may take various forms, depending on the particular implementation.

For example, persistent storage 1808 may contain one or more components or devices. For example, persistent storage 1808 can be a hard drive, a solid-state drive (SSD), a flash memory, a rewritable optical disk, a rewritable magnetic tape, or some combination of the above. The media used by persistent storage 1808 also can be removable. For example, a removable hard drive can be used for persistent storage 1808.

Communications unit 1810, in these illustrative examples, provides for communications with other data processing systems or devices. In these illustrative examples, communications unit 1810 is a network interface card.

Input/output unit 1812 allows for input and output of data with other devices that can be connected to data processing system 1800. For example, input/output unit 1812 may provide a connection for user input through at least one of a keyboard, a mouse, or some other suitable input device. Further, input/output unit 1812 may send output to a printer. Display 1814 provides a mechanism to display information to a user.

Instructions for at least one of the operating system, applications, or programs can be located in storage devices 1816, which are in communication with processor unit 1804 through communications framework 1802. The processes of the different embodiments can be performed by processor unit 1804 using computer-implemented instructions, which may be located in a memory, such as memory 1806.

These instructions are referred to as program instructions, computer usable program instructions, or computer-readable program instructions that can be read and executed by a processor in processor unit 1804. The program instructions in the different embodiments can be embodied on different physical or computer-readable storage media, such as memory 1806 or persistent storage 1808.

Program instructions 1818 is located in a functional form on computer-readable media 1820 that is selectively removable and can be loaded onto or transferred to data processing system 1800 for execution by processor unit 1804. Program instructions 1818 and computer-readable media 1820 form computer program product 1822 in these illustrative examples. In the illustrative example, computer-readable media 1820 is computer readable storage media 1824.

Computer readable storage media 1824 is a physical or tangible storage device used to store program instructions 1818 rather than a medium that propagates or transmits program instructions 1818. Computer readable storage media 1824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1818 can be transferred to data processing system 1800 using a computer-readable signal media. The computer-readable signal media are signals and can be, for example, a propagated data signal containing program instructions 1818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1820" can be singular or plural. For example, program instructions 1818 can be located in computer-readable media 1820 in the form of a single storage device or system. In another example, program instructions 1818 can be located in computer-readable media 1820 that is distributed in multiple data processing systems. In other words, some instructions in program instructions 1818 can be located in one data processing system while other instructions in program instructions 1818 can be located in one data processing system. For example, a portion of program instructions 1818 can be located in computer-readable media 1820 in a server computer while another portion of program instructions 1818 can be located in computer-readable media 1820 located in a set of client computers.

The different components illustrated for data processing system 1800 are not meant to provide architectural limitations to the manner in which different embodiments can be implemented. In some illustrative examples, one or more of the components may be incorporated in or otherwise form a portion of, another component. For example, memory 1806, or portions thereof, may be incorporated in processor unit 1804 in some illustrative examples. The different illustrative embodiments can be implemented in a data processing system including components in addition to or in place of those illustrated for data processing system 1800. Other components shown in FIG. 18 can be varied from the illustrative examples shown. The different embodiments can be implemented using any hardware device or system capable of running program instructions 1818.

Thus, illustrative embodiments of the present invention provide a computer implemented method, computer system, and computer program product for managing a topology for a network computing system. A number of processor units determines tasks for a workload to be performed by computing devices in the network computing system. The number of processor units creates the topology for performing the tasks in the workload. The topology comprises nodes representing the tasks assigned to the computing devices. The nodes are connected to each other based on an execution order for the tasks, and the topology has alternative paths for performing the tasks for the workload. The number of processor units determines energy consumption for the alternative paths in the topology. The number of processor units selects a particular path from the alternative paths for performing the tasks for the workload based on the energy consumption for the alternative paths.

In the illustrative examples, workload processing occurs while reducing the amount of energy used to process the workloads through the selection of computing devices to perform tasks for the workloads. In the illustrative examples, topology management is used to decrease the amount of energy consumed to perform tasks for workloads. Additionally, other performance metrics can be considered to provide a desired user experience for users of services that perform these workloads. This type of topology management can reduce the energy costs for various network computing systems including those using cloud computing environments.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing a topology for a network computing system, the computer implemented method comprising:

determining, by a number of processor units, tasks for a workload to be performed by computing devices in the network computing system;

identifying, by the number of processor units, nodes representing the tasks in the workload for the topology based on explicit tasks in the workload and implicit tasks that do not currently exist in the workload when the workload starts and are performed based on results of performing other tasks for various conditions that are present during performance of the explicit tasks in the workload;

creating, by the number of processor units, the topology for performing the tasks in the workload, wherein the topology comprises the nodes representing the tasks assigned to the computing devices, the nodes are connected to each other based on an execution order for the tasks, and the topology has alternative paths for performing the tasks for the workload;

determining, by the number of processor units, energy consumption for performing the tasks in the workload in each of the alternative paths in the topology;

determining, by the number of processor units, the energy consumption incurred for network communications between different computing devices performing sequential tasks in ungrouped nodes in the alternative paths in the topology;

selecting, by the number of processor units, a particular path from the alternative paths for performing the tasks for the workload based on the energy consumption for performing the tasks in the workload in each of the alternative paths in the topology and the energy consumption incurred for the network communications between the different computing devices performing the sequential tasks in the ungrouped nodes in the alternative paths in the topology; and dispatching, by the number of processor units, the tasks of the workload to the computing devices of the particular path selected from the alternative paths in the network computing system to reduce an amount of energy used and increase energy efficiency of the network computing system.

2. The computer implemented method of claim 1, wherein creating, by the number of processor units, the topology for performing the tasks in the workload comprises:

creating, by the number of processor units, initial topologies for the tasks, wherein a first initial topology in the initial topologies comprises the nodes for a first path in the alternative paths for performing the tasks using a first subset of the computing devices that is different from a second initial topology in the initial topologies that comprises the nodes for a second path in the alternative paths for performing the tasks using a second subset of the computing devices; and combining, by the number of processor units, the initial topologies for the tasks to form the topology with the alternative paths for performing the tasks.

3. The computer implemented method of claim 1, wherein creating, by the number of processor units, the topology for performing the tasks in the workload comprises:

identifying, by the number of processor units, which of the computing devices can perform the tasks in the workload, wherein a same task in the tasks can be performed by different computing devices in the computing devices; and placing, by the number of processor units, the nodes for the same task assigned to the different computing devices in different paths in the alternative paths.

4. The computer implemented method of claim 1, wherein creating, by the number of processor units, the topology for performing the tasks in the workload comprises:

connecting, by the number of processor units, the nodes for the topology to each other based on the execution order for the tasks and a dependency between the tasks to form the topology, wherein the topology has the alternative paths for performing the tasks for the workload.

5. The computer implemented method of claim 1, wherein determining, by the number of processor units, the energy consumption for performing the tasks in the workload in each of the alternative paths in the topology comprises:

determining, by the number of processor units, the energy consumption for performing the tasks in each of the alternative paths in the topology based on the computing devices assigned to the tasks.

6. The computer implemented method of claim 1, wherein selecting, by the number of processor units, the particular path from the alternative paths for performing the tasks for the workload based on the energy consumption for performing the tasks in the workload in each of the alternative paths and the energy consumption incurred for the network communications between the different computing devices performing the sequential tasks in the ungrouped nodes in the alternative paths in the topology comprises:

selecting, by the number of processor units, the particular path from the alternative paths for performing the tasks for the workload based on the energy consumption for performing the tasks in the workload in each of the alternative paths, the energy consumption incurred for the network communications between the different computing devices performing the sequential tasks in the ungrouped nodes in the alternative paths in the topology, and a set performance metrics that includes response time, uptime, resource use, and preference to use particular computing devices.

7. The computer implemented method of claim 1, wherein the tasks to be performed are selected from a group consisting of at least one of an explicit task or an implicit task.

8. The computer implemented method of claim 1 further comprising:

analyzing, by the number of processor units, workloads performed by the computing devices in the network computing system; and generating, by the number of processor units, a knowledge base for the workloads including a context, an input, an output, a condition, and the energy consumption for each task in the workloads and computing device descriptions based on the computing devices performing a given task, wherein the knowledge base is used to determine the energy consumption for the tasks in the workloads.

9. A computer system for managing a topology for a network computing system, the computer system comprising:

a number of processor units, wherein the number of processor units executes program instructions to:

determine tasks for a workload to be performed by computing devices in the network computing system;

identify nodes representing the tasks in the workload for the topology based on explicit tasks in the workload and implicit tasks that do not currently exist in the workload when the workload starts and are performed based on results of performing other tasks for various conditions that are present during performance of the explicit tasks in the workload;

create a topology for performing the tasks in the workload, wherein the topology comprises the nodes representing the tasks assigned to the computing devices, the nodes are connected to each other based on an execution order for the tasks, and the topology has alternative paths for performing the tasks for the workload;

determine energy consumption for performing the tasks in the workload in each of the alternative paths in the topology;

determine the energy consumption incurred for network communications between different computing devices performing sequential tasks in ungrouped nodes in the alternative paths in the topology;

select a particular path from the alternative paths for performing the tasks for the workload based on the energy consumption for performing the tasks in the workload in each of the alternative paths in the topology and the energy consumption incurred for the network communications between the different computing devices performing the sequential tasks in the ungrouped nodes in the alternative paths in the topology; and dispatch the tasks of the workload to the computing devices of the particular path selected from the alternative paths in the network computing system to reduce an amount of energy used and increase energy efficiency of the network computing system.

10. The computer system of claim 9, wherein in creating the topology for performing the tasks in the workload, the number of processor units executes the program instructions to:

create initial topologies for the tasks, wherein a first initial topology in the initial topologies comprises the nodes for a first path in the alternative paths for performing the tasks using a first subset of the computing devices that is different from a second initial topology in the initial topologies that comprises the nodes for a second path in the alternative paths for performing the tasks using a second subset of the computing devices; and combine the initial topologies for the tasks to form the topology with the alternative paths for performing the tasks.

11. The computer system of claim 9, wherein in creating the topology for performing the tasks in the workload, the number of processor units executes the program instructions to:

identify which of the computing devices can perform the tasks in the workload, wherein a same task in the tasks can be performed by different computing devices in the computing devices; and place the nodes for the same task assigned to the different computing devices in different paths in the alternative paths.

12. The computer system of claim 9, wherein in creating the topology for performing the tasks in the workload, the number of processor units executes the program instructions to:

connect the nodes for the topology to each other based on the execution order for the tasks and a dependency between the tasks to form the topology, wherein the topology has the alternative paths for performing the tasks for the workload.

13. The computer system of claim 9, wherein in determining the energy consumption for performing the tasks in the workload in each of the alternative paths in the topology, the number of processor units executes the program instructions to:

determine the energy consumption for performing the tasks in each of the alternative paths in the topology based on the computing devices assigned to the tasks.

14. The computer system of claim 9, wherein in selecting the particular path from the alternative paths for performing the tasks for the workload based on the energy consumption for performing the tasks in the workload in each of the alternative paths and the energy consumption incurred for the network communications between the different computing devices performing the sequential tasks in the ungrouped nodes in the alternative paths in the topology comprises, the number of processor units executes the program instructions to:

select the particular path from the alternative paths for performing the tasks for the workload based on the energy consumption for performing the tasks in the workload in each of the alternative paths, the energy consumption incurred for the network communications between the different computing devices performing the sequential tasks in the ungrouped nodes in the alternative paths in the topology, and a set performance metrics that includes response time, uptime, resource use, and preference to use particular computing devices.

15. The computer system of claim 9, wherein the tasks to be performed are selected from a group consisting of at least one of an explicit task or an implicit task.

16. The computer system of claim 9, wherein the number of processor units executes the program instructions to:

analyze workloads performed by the computing devices in the network computing system; and generate a knowledge base for the workloads including a context, an input, an output, a condition, and the energy consumption for each task in the workloads and computing device descriptions based on the computing devices performing a given task, wherein the knowledge base is used to determine the energy consumption for the tasks in the workloads.

17. A computer program product for managing a topology for a network computing system, the computer program product comprising a computer readable storage medium having program instructions embodied therewith, the program instructions executable by a computer system to cause the computer system to perform a method of:

determining, by a number of processor units, tasks for a workload to be performed by computing devices in the network computing system;

identifying, by the number of processor units, nodes representing the tasks in the workload for the topology based on explicit tasks in the workload and implicit tasks that do not currently exist in the workload when the workload starts and are performed based on results of performing other tasks for various conditions that are present during performance of the explicit tasks in the workload;

creating, by the number of processor units, the topology for performing the tasks in the workload, wherein the topology comprises the nodes representing the tasks assigned to the computing devices; the nodes are connected to each other based on an execution order for the tasks, and the topology has alternative paths for performing the tasks for the workload;

determining, by the number of processor units, energy consumption for performing the tasks in the workload in each of the alternative paths in the topology;

determining, by the number of processor units, the energy consumption incurred for network communications between different computing devices performing sequential tasks in ungrouped nodes in the alternative paths in the topology;

selecting, by the number of processor units, a particular path from the alternative paths for performing the tasks for the workload based on the energy consumption for performing the tasks in the workload in each of the alternative paths in the topology and the energy consumption incurred for the network communications between the different computing devices performing the sequential tasks in the ungrouped nodes in the alternative paths in the topology; and dispatching, by the number of processor units, the tasks of the workload to the computing devices of the particular path selected from the alternative paths in the network computing system to reduce an amount of energy used and increase energy efficiency of the network computing system.

18. The computer program product of claim 17, wherein determining, by the number of processor units, the energy consumption for performing the tasks in the workload in each of the alternative paths in the topology comprises:

determining the energy consumption for performing the tasks in each of the alternative paths in the topology based on the computing devices assigned to the tasks.

* * * * *